United States Patent [19]

Namiki et al.

[11] Patent Number: 5,479,262
[45] Date of Patent: Dec. 26, 1995

[54] DIGITAL IMAGE FORMING APPARATUS

[75] Inventors: Kazuhiko Namiki, Machida; Eiko Mito, Tokyo; Masahiro Ishikawa, Yokohama; Michihito Ohashi, Kawasaki; Isamu Tanaka, Taira, all of Japan

[73] Assignee: Ricoh Company, Ltd., Tokyo, Japan

[21] Appl. No.: 96,981

[22] Filed: Jul. 27, 1993

[30] Foreign Application Priority Data

Jul. 27, 1992 [JP] Japan .................................. 4-199534

[51] Int. Cl.$^6$ ..................................................... H04N 1/21
[52] U.S. Cl. ............................................ 358/296; 358/453
[58] Field of Search ................................. 347/240, 251, 347/131; 358/448, 449, 451, 452, 453, 455, 456, 296, 298, 300, 302

[56] References Cited

U.S. PATENT DOCUMENTS

| | | | |
|---|---|---|---|
| 3,720,812 | 3/1973 | Downs | 348/138 |
| 5,168,532 | 12/1992 | Seppi et al. | 382/50 |
| 5,221,963 | 6/1993 | Hashimoto et al. | 358/209 |

*Primary Examiner*—Mark J. Reinhart

*Attorney, Agent, or Firm*—Oblon, Spivak, McClelland, Maier & Neustadt

[57] ABSTRACT

A digital image forming apparatus which detects a center of a book document when reading and writing an image of the document, including a document, a document board on which the document is set, a reading device for reading the document by scanning the document, an A/D converter for converting an analog signal which is read by the reading device to a digital signal, a signal processor for processing the digital signal, including a first detector for detecting the existence of a dark portion in the image of the document and judging the document to be a book document if the document image has the dark portion, based on the signal corresponding to at least two lines on the document in a scanning direction, or in a direction perpendicular to the scanning direction and a second detector for detecting a center portion of the document on the basis of each center dark portion of each signal of the lines if the document is judged to be a book document, and a writing device for writing the digital signal on a photoconductive element in relation to the detected center portion. Edge portions of the document can similarly be detected and used in writing an image of the document so that an unnecessary part of the book document can be erased with simple structure and operation.

11 Claims, 3 Drawing Sheets

DIGITAL IMAGE FORMING APPARATUS

BACKGROUND OF THE INVENTION

1. Field of the Invention

The present invention relates to a digital image forming apparatus, for use in a digital copying machine, a digital facsimile, etc. The invention relates, particularly, to an digital image forming apparatus having simple structure and operation for detecting a center portion of a book document.

2. Discussion of Background

In Japanese Patent Laid-open Publication No. 63-41148, an image forming apparatus is described, in which a photo sensor is installed on a document board to detect a center position of a book document. Moreover, in Japanese Patent Laid-Open Publication No. 59-170856, an apparatus, in which a detector for detecting the document size on a platen glass board and a discharger for discharging and erasing a part of a photoconductive element are installed, is described. Then in the apparatus, an unnecessary part of a photoconductive element is prevented from developing by driving a discharger on the basis of a signal of a document size.

In one image forming apparatus, the photo sensor is installed on the document board to detect the center portion of the book document. Moreover, in the other apparatus for preventing a part of a photoconductive element from developing, as the discharged and erased part on the photoconductive element is decided only by the document size, a necessary part of the document may be erased when the document is shifted from the correct position on the platen glass board.

SUMMARY OF THE INVENTION

Accordingly, one object of this invention is to provide a digital image forming apparatus having simple structure and operation that detects a center portion of a book document.

Another object of the invention is to provide a digital image forming apparatus having simple structure and operation that erases an unnecessary part of the book document.

These and other objects and advantages are achieved by the present invention which provides for a digital image forming apparatus for reading and writing an image of a document, including, a document board on which a document is set, a reading device for reading the document by scanning, an A/D converter for converting an analog signal which is read by the reading device to a digital signal, a signal processor for processing the digital signal which includes a first detector for detecting the existence of a dark portion in the document and judging the document to be a book document if the document has the dark portion, using the signal of at least two lines on the document in a scanning direction or in a direction perpendicular to the scanning direction and a second detector for detecting a center portion of the document on the basis of each center dark portion of each signal of the lines if the document is judged a book document, and a writing device for writing the digital signal on a photoconductive element. In accordance with one aspect of the invention, a center of a book document can be detected with simple structure and operation. In accordance with another aspect of the invention, an unnecessary part of the book document can be erased with simple structure and operation.

BRIEF DESCRIPTION OF THE DRAWINGS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A more complete appreciation of the invention and the many attendant advantages thereof will become readily apparent from the following detailed description, particularly when considered in conjunction with the drawings in which.

DESCRIPTION OF THE PREFERRED EMBODIMENTS

Figure 1:
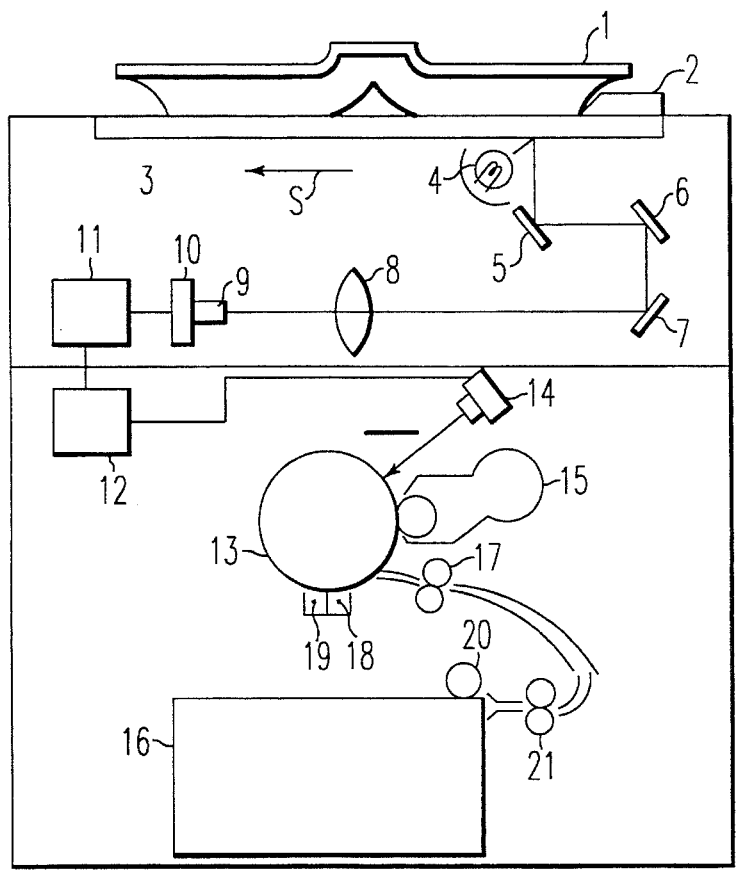
FIG. 1 is a schematic side view of an embodiment of the present invention.

Referring now to the drawings, wherein like reference numerals designate identical or corresponding parts throughout the several views, and more particularly to FIG. 1 thereof, FIG. 1 shows the first preferred embodiment of this invention. This first embodiment is a digital copying machine. A document, such as a book document 1, is set on a document board, with the edge of the document 1 set against a document scale 2 and with the spreading direction of the book document extending in the scanning direction $\underline{s}$. Then the document is scanned by a document scanner. This scanner is composed of a light source 4, mirrors 5–7, a lens 8, an image sensor CCD 9 and an A/D converter.

The document on a document board 3 is illuminated by the light source 4. The reflecting light is focused on the CCD 9 by way of the mirrors 5–7 and the lens 8, and then it is converted to an electronic signal. A moving optical device moves in the direction $\underline{s}$ perpendicular to the document scale 2 by means of a driving mechanism. As a result, sub-scanning of the document is carried out. Then the CCD 9 converts a light image of the document 1 to an electronic signal and outputs the light image in time serial form as an electronic image signal.

The A/D converter converts the electronic analog signal to a digital image signal. The signal from the A/D converter 10 is stored in a memory 11. A signal processor 12 reads the image signal from the memory, processes the signal in a predetermined way and outputs the signal to a writing device. The writing device includes a photoconductive element 13, a light emission diode array 14, a developing device 15, a paper feed unit 16, a resist roller 17, a transfer corona 18 and a separation corona 19. Moreover it has a charge corona, cleaning device, a discharger, a fixing device, etc. which are not shown in FIG. 1.

The photoconductive element 13 is driven rotatively by a main motor and is charged uniformly by the charge corona (not shown). Then the light emission diode array 14, which is modulated by an image signal from the signal processor, writes an image on the element 13. As a result, a latent image is formed.

The latent image on the photoconductive element 13 is developed by the developing device 15 and then becomes a visible image. The paper feed unit 16 feeds a sheet of paper by a pick up roller 20 and then the sheet is conveyed to the resist roller 17 by way of a transport roller 21. The resist roller 17 feeds the sheet at a predetermined timing. The visible image on the photoconductive element 13 is transferred by the transfer corona 18 and is separated by the separation corona 19. Then the visible image is fixed by the fixing device. Finally, the sheet is transported to the outside as a copy. Moreover residual toner on the photoconductive element 13 is removed by the cleaning device (not shown) and residual charge is erased by the discharger (not shown).

Figure 2:
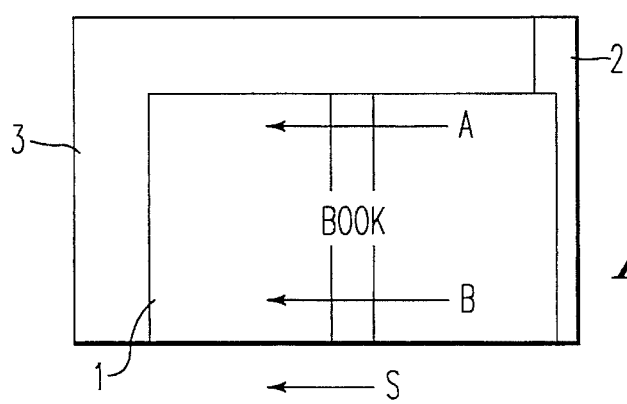
FIG. 2 is a plan view showing the state of setting a book document on a document board.
Figure 3:
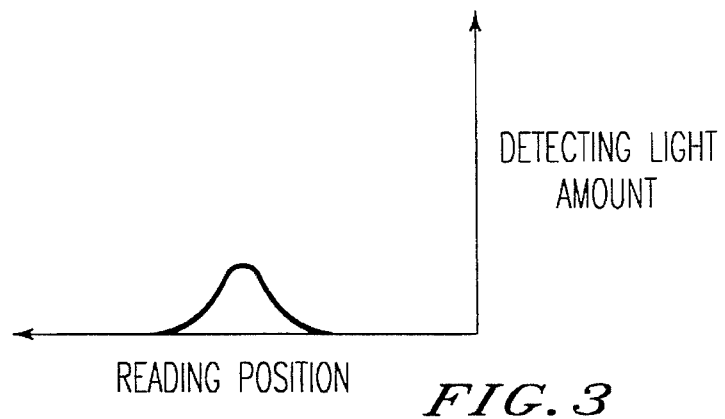
FIG. 3 is a graph showing the relation between the detected light amount and a scanning moving amount in the embodiment of FIG. 2.

As shown in FIG. 2, the case when the book document is set on the document board 3 with the spreading direction of the book document parallel to the scanning direction $s$ will be described. Plural lines A, B in the direction parallel to the scanning direction $s$ are read. As the document scanner reads the center portion of the book document darkly in the lines A, B, the characteristic of the detected light amount of the CCD 9 has a peak in the center portion of the book document as shown in FIG. 3 (A vertical axis in FIG. 3 indicates the converse of the detected light amount on the CCD). Now the reading position or scanning moving amount in FIG. 3 defines the moving amount in the scanning direction $s$ of the moving optical device 4–7. The number and location of the plural lines are predetermined, with at least two lines parallel to the scanning direction $s$, such as the two lines A, B, being employed in this embodiment.

Figure 8:
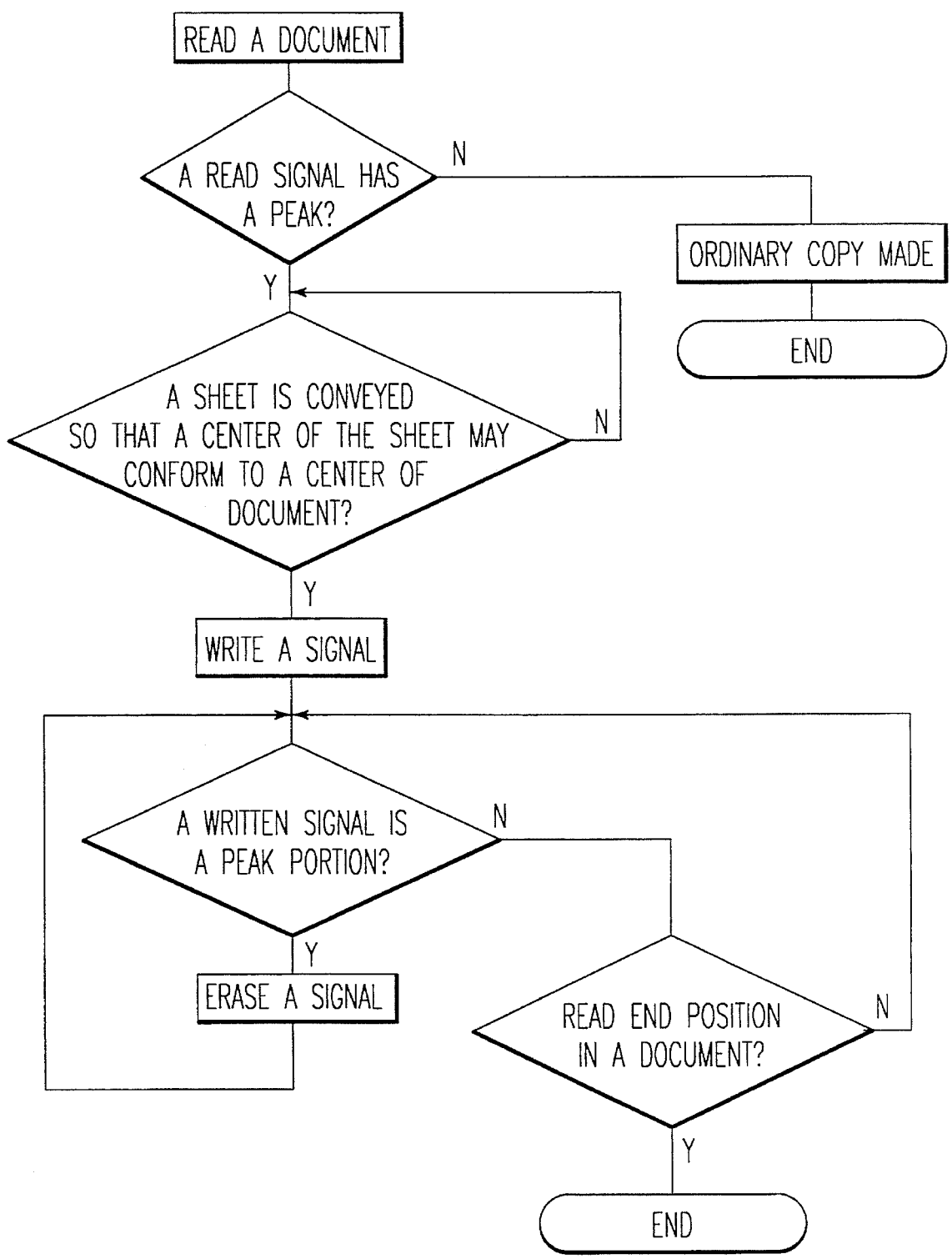
FIG. 8 is a operation flow chart showing processing steps performed according to the invention.

FIG. 8 shows an operation flow chart of this first embodiment. The signal processor 12 judges the presence of a book document or not by the following. If the image signal corresponding to the line A, B has a peak in the center, a document is judged to be a book document. On the other hand, if it does not have a peak in the center, a document is judged to be a photograph document or something other than a book document.

Then, if the signal processor 12 judges the document to be a book document, it sets writing timing of the light emission diode array so that the peak portion (the center portion in the book document) of the line A, B may be transferred on the center portion of the sheet.

Moreover, the signal processor 12 performs control so that the peak portion (the center portion in the book document) of the image signal may be erased from the memory 11 and may not be written on the photoconductive element.

As a result, in this embodiment, as the document is judged to be a book document or not based on the image signal, it can be judged correctly with no use of the photo sensor. Moreover, the document is judged to be a book document if the image signal corresponded to the lines A, B has a peak in the center. Therefore, even if the book document is shifted from the correct position on the document board, the book document can be written correctly on the sheet. Thus the margin when the book document is set on the document board can be improved. In addition, as the peak of the image signal is erased, the shadow that is generated by reading the center portion of the book document darkly is erased. Therefore a clean copy in which the shadow is erased can be obtained and wasteful toner consumption can be reduced.

Figure 4:
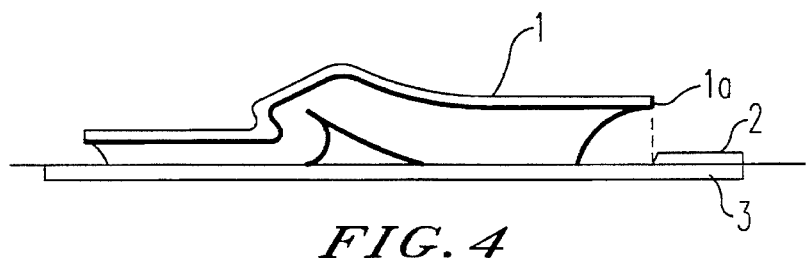
FIG. 4 is a side view showing the state of setting a book document in another embodiment.
Figure 5:
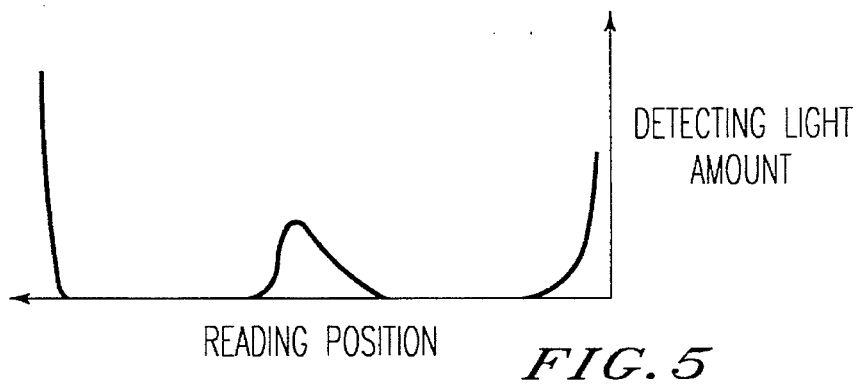
FIG. 5 is a graph showing the relation between the detected light amount and the scanning moving amount in the embodiment of FIG. 4.

Next, a second preferred embodiment will be described. As shown in FIG. 4, a thick book document 1 in which the length or distance of the both sides of its spread are different is set on the document board 3, with the edge of its cover disposed adjacent to the document scale 2. In the plural lines A, B in the direction parallel to the scanning direction $s$, the peak position that is shifted from the center of the book document is as shown in FIG. 5.

Therefore, in the second embodiment, the signal processor 12 detects the dark portions except the center portion in the image signal from the memory and judges the dark portions to be edges of the book document. The timing of writing the image is adjusted so that the center between those edges may conform to the center of the sheet. Namely when the sheet is conveyed until the center between those edges conforms to the center of the sheet, the light emission diode array 14 starts to write the image.

Moreover, the signal processor 12 controls so that not only the center portion but also the edge portions in the scanning direction $s$ in the image signal from the memory may be erased and may not be written in the photoconductive element 13.

As a result, in the second embodiment, in addition to the technical advantage of the first embodiment, as the image is written so that the center between the peaks of the both edges of the book document may conform to the center of the sheet, a clean image copy can be obtained even when the book document in which the width of the pages on opposite sides of its spread are different. Moreover, as the peaks of the image signal corresponding to the center portion and the edge portions are erased, the shadows that are generated by reading those portions of the book document darkly are erased. Therefore a clean copy in which the shadows are erased can be obtained and wasteful toner consumption can be reduced.

Next, the preferred third embodiment will be described. In this embodiment, as well as the second embodiment, the signal processor 12 detects the dark portions other than the center portion in the image signal from the memory and judges the dark portions to be edges of the book document. The signal processor 12 compares the length between the edges to the length of the sheet and then determines a magnification ratio in relation to the two lengths. The light emission diode array 14 writes at the magnification ratio.

Therefore in this embodiment, in addition to the technical advantage of the second embodiment, as the length between the edges of the book document is compared to the length of the sheet, a corresponding magnification ratio is derived based on the two lengths and then the image is written at the derived magnification ratio, a book document that has arbitrary length can be copied and the convenience of the apparatus can be improved.

Figure 7:
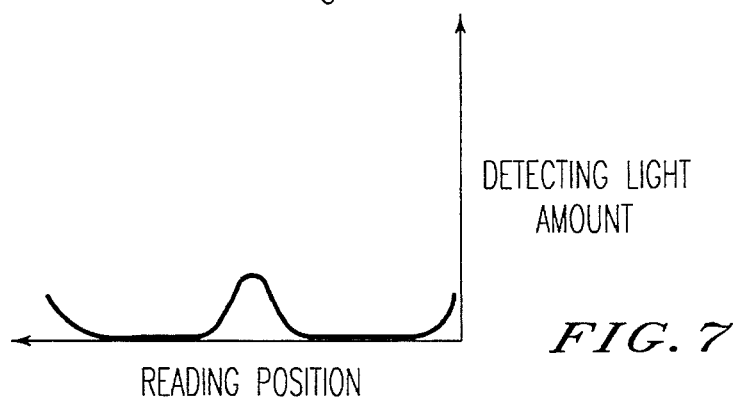
FIG. 7 is a graph showing the relation between the detected light amount and the reading position in a direction perpendicular to the scanning direction of FIG. 6.
Figure 6:
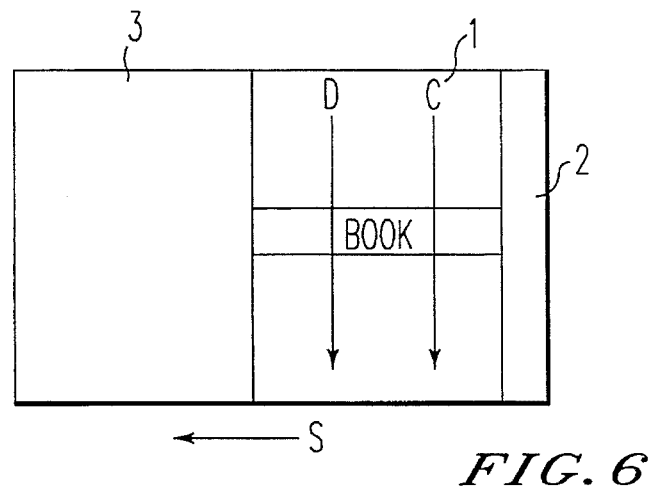
FIG. 6 is a plan view showing the state of setting a book document in another embodiment.

Finally, a fourth embodiment will be described. When a book document 1 is set on the document board 3, with the edge of the document 1 disposed adjacent to a document scale 2 and with the spreading direction of the book document arranged perpendicular to the scanning direction $s$ as shown in FIG. 6, the detected light amount of the CCD 9 has peaks at the center portion and the both edge portions of the book document in the direction perpendicular to the scanning direction $s$ as shown in FIG. 7 (there is no peak in the scanning direction $s$).

Therefore in this embodiment, the signal processor 12 judges the book document by means of at least two lines C, D that are perpendicular to the scanning direction s having respective peaks in the center of the book document. Moreover, as well as with the other embodiments described above, the center of the book document is conformed to the center of the sheet and the shadow that is generated by reading the center portion or/and the both edge portions of the book document darkly is erased.

As a result, when the book document is set on the document board 3 with the edge of the book document 1 disposed adjacent to a document scale 2 and with the spreading direction of the book document arranged perpendicular to the scanning direction s, the same technical advantages as obtained with the embodiments described above can be also obtained.

Various modification and variations of the above-described embodiments of the present invention are possible, as appreciated by those skilled in the art in light of the above teachings. It is therefore to be understood that, within the scope of the appended claims and their equivalents, the invention may be practiced otherwise than as specifically described herein.

What is claimed as new and desired to be secured by Letters Patent of the United States is:

1. A digital image forming apparatus for reading and writing an image of a document, comprising:

a document board on which the document is set;

reading means for reading the document by scanning the document;

an A/D converter for converting an analog signal which is read by the reading means to a digital signal;

signal processing means for processing the digital signal, comprising, first detecting means for detecting the existence of a dark portion in the image of the document and judging the document to be a book document if the image of the document has said dark portion, based on the signal corresponding to at least two lines in a scanning direction or in a direction perpendicular to the scanning direction, and second detecting means for detecting a center portion of the document on the basis of a center dark portion of the signal of said at least two lines if the document is judged to be a book document; and writing means for writing the digital signal on a photoconductive element in relation to the detected center portion.

2. The digital image forming apparatus of claim 1, wherein said signal processing means comprises means for adjusting the timing for writing so that a center of a sheet of paper on which the image of the document is to be written conforms to a center of the book document.

3. The digital image forming apparatus of claim 2, wherein said signal processing means comprises means for erasing the center dark portion from the digital signal when writing the document image.

4. The digital document forming apparatus of claim 1, wherein the book document is arranged with a page spreading direction parallel to the scanning direction of the reading means, and the direction of the lines is parallel to the scanning direction.

5. The digital image forming apparatus of claim 1, wherein the book document is arranged with a page spreading direction of the book document perpendicular to the scanning direction of the reading means, and the direction of the lines is perpendicular to the scanning direction.

6. A digital image forming apparatus for reading and writing an image of a document, comprising:

a document board on which the document is set;

reading means for reading the document by scanning the document;

an A/D converter for converting an analog signal which is read by the reading means to a digital signal;

signal processing means for processing the digital signal, comprising, first detecting means for detecting the existence of a dark portion in the image of the document and judging the document to be a book document if the document has said dark portion, based on the signal corresponding to at least two lines on the document in a scanning direction or in a direction perpendicular to the scanning direction, and second detecting means for detecting a center portion of the document on the basis of the edge dark portions of the lines if the document is judged to be a book document; and writing means for writing the digital signal on a photoconductive element in relation to the detected edge dark portions.

7. The image forming apparatus of claim 6, wherein the signal processing means comprises means for setting a magnification of an image to be written by comparing a size of a sheet of paper to the length between edge dark portions of the book document.

8. The digital image forming apparatus of claim 6, wherein said signal processing means comprises means for adjusting the timing for writing so that a center of a sheet of paper on which the image of the document to be written conforms to a center of the book document.

9. The digital image forming apparatus of claim 7, wherein said signal processing means comprises means for erasing the center portion from the digital signal when writing the image of the document.

10. The digital document forming apparatus of claim 6, wherein the book document is arranged with a page spreading direction parallel to the scanning direction of the reading means, and the direction of the lines is parallel to the scanning direction.

11. The digital image forming apparatus of claim 6, wherein the book document is arranged with a page spreading direction of the book document perpendicular to the scanning direction of the reading means, and the direction of the lines is perpendicular to the scanning direction.

* * * * *